Oct. 27, 1964  M. S. LONG  3,154,207
TRAILER FOR CARRYING TRUSSES AND THE LIKE
Filed Sept. 5, 1962
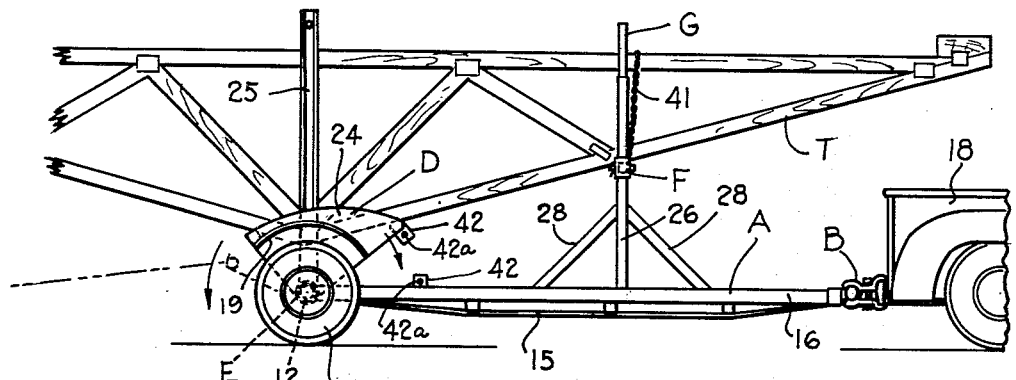
Fig. 1.
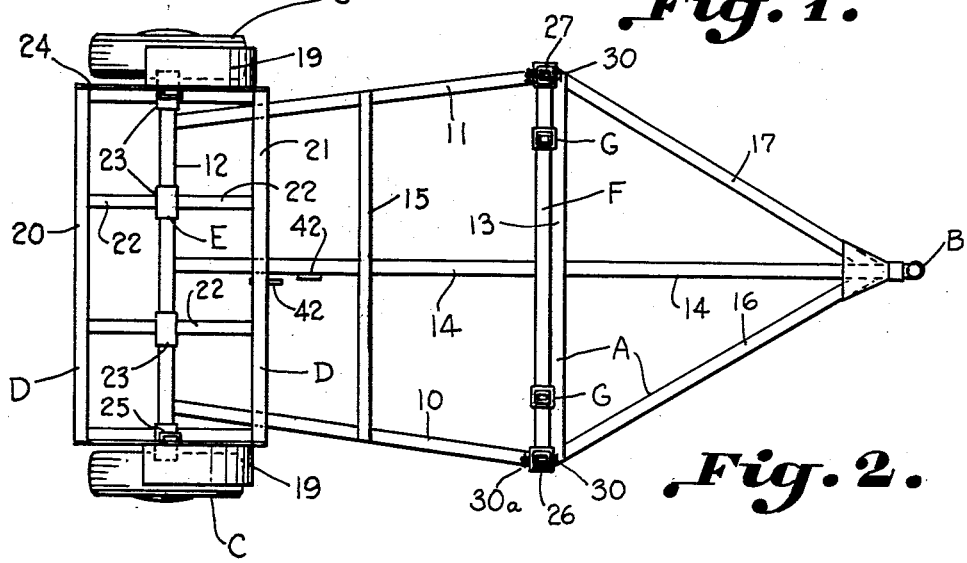
Fig. 2.
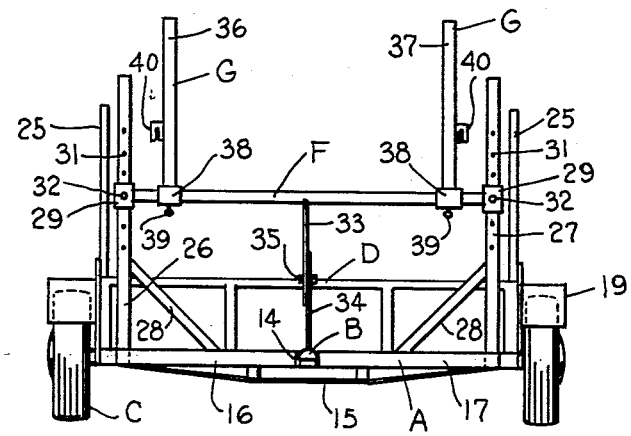
Fig. 3.
INVENTOR.
MERLE S. LONG
BY 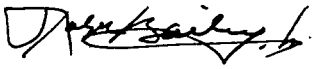
ATTORNEY

United States Patent Office 3,154,207
Patented Oct. 27, 1964

3,154,207
TRAILER FOR CARRYING TRUSSES
AND THE LIKE
Merle S. Long, 22 Botany Road, Greenville, S.C.
Filed Sept. 5, 1962, Ser. No. 221,524
4 Claims. (Cl. 214—501)

This invention relates to materials handling equipment and especially to a trailer for carrying trusses and the like in which means are provided for easy loading and unloading while conserving space, so as to adapt same to be towed behind a vehicle.

Heretofore, it has been necessary to ship trusses using large trucks or flat cars in order to accommodate the relatively large size of the trusses. Since the large cumbersome trusses were loaded upon large vehicles, the loading and unloading was of necessity a difficult job in which the trusses themselves were often damaged.

Accordingly, it is an important object of this invention to provide a trailer for carrying trusses and the like which will be easy to load and unload.

Another important object of the present invention is to provide a truss trailer which will conserve space and prevent damage to the trusses loaded thereon, and yet permit same to be hauled behind a vehicle.

Another object of the invention is to provide means for easily removing some of the trusses, and then tightly gripping the remainder of the trusses to prevent damages to same during movement to another location.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIGURE 1 is a side elevation illustrating a trailer constructed in accordance with the present invention in position to be moved by a hauling vehicle, FIGURE 2 is an enlarged plan view illustrating the trailer shown in FIGURE 1, and FIGURE 3 is a front elevation further illustrating the trailer shown in FIGURES 1 and 2.

The drawing illustrates a trailer, for carrying trusses and the like, constructed in accordance with the present invention. The trailer includes an elongated substantially horizontal frame A. Means B, for hitching the frame to a hauling device, are carried by the frame. The wheels C are provided for supporting the frame, preferably in the form of a pair of rear wheels. A transverse cradle D, for receiving the apexes of the longitudinally disposed trusses, is carried adjacent the rear of the frame. Means E are provided for mounting the cradle for pivotal movement with respect to the frame. A horizontal bar F is mounted for vertical adjustment and carried by the frame spaced forwardly of the cradle. Adjustable side supports G are carried by the horizontal bar for offering lateral support for the trusses.

Referring more particularly to the drawing, the frame A is constructed essentially of square tubular members including a pair of side members 10 and 11 which converge rearwardly. A round tubular member 12 forms a rear frame member to which the side members 10 and 11 are attached such as by welding. A pair of square tubular members 13 form an intermediate portion of the frame to which the forward portions of the side members 10 and 11 are attached as by welding. A longitudinal member 14 provides stability for the frame A and suitable bracing 15 is provided to add rigidity to the frame A. A trailer hitch B is shown secured to a forwardly extending portion of the frame A, which includes a pair of forwardly converging side portions 16 and 17. Any suitable means may be provided for attaching the forward portion of the frame A to a towing or hauling vehicle 18. It will be noted by reference to FIGURE 1, that a portion of the trusses T extend over the vehicle, thus conserving space.

The wheels C are suitably mounted for rotation upon the frame A through attachment to the rear tubular frame member 12. If desired fenders 19 may be provided. It is preferred that the load presented by the trusses T be positioned directly over the wheels C. A cradle D for positioning the apexes of the trusses T is constructed essentially of a pair of spaced transverse horizontally disposed frame members 20 and 21. These transverse frame members 20 and 21 are spaced from the rear frame member 12 by diverging supports 22.

The means E for mounting the cradle for pivotal movement with respect to the frame includes a number of spaced tubular members 23 which are mounted for oscillation upon the rear frame member 12 which forms a shaft therefor. The support members 22 converge and a pair of such support members are suitably secured as by welding to each of the spaced tubular members 23. A gusset plate 24 joins each of the ends of the cradle to form a trough like structure which is tiltable with respect to the frame A. It is evident that the cradle D readily receives the apexes of the longitudinally arranged trusses T so as to position them above the wheels C. A standard 25 is carried adjacent each side of the cradle D and serves to position the trusses against lateral movement.

A horizontal bar F is carried by the frame forwardly of the cradle D, and in an intermediate portion of the frame. The bar F is mounted for vertical adjustment upon a pair of standards 26 and 27, each of which is provided with suitable bracing 28 for rigidly fixing same upon the frame A. Means for vertically adjusting the bar F include sleeves 29 fixed at each end of the bar and slidably mounted upon each of the standards 26 and 27 respectively. A pin 30 may be passed through corresponding apertures 31 and 32 in the standards and in the sleeves respectively, and provided with suitable means in the form of a cotter pin 30a for fixing same so as to limit movement of the sleeves with respect to the standards. A centrally disposed brace in the form of bars 33 and 34 fixed to the bar F, and the longitudinal ber 14 respectively, may be fixed with respect to each other by tightening a bolt 35. The bolt 35 is loosened for purposes of adjusting the height of the bar F, and then tightened for providing a rigid medial support therefor.

Adjustable side supports G are carried upon the horizontal bar F and include standard portions 36 and 37 which are each carried by sleeves 38 slidably positioned upon the bar F. Setscrews 39 or other means are provided for fixing the position of the sleeves 38 with respect to the bar F. It will be observed that the forward portion of the trusses T may be positioned between the standards 36 and 37, and then the setscrews tightened to position the standards against the outermost sides of the trusses T in order to offer lateral support therefor. A pair of lateral projections 40 are carried by the standards 36 and 37 respectively, for positioning a chain 41 or other suitable fastening means for securing the forward portion of the trusses T so that one of the cords thereof bears downwardly against the bar F, thus mounting the trusses in such a manner as to prevent movement of same during transportation thereof. In order to prevent excessive rattling when the trailer is not loaded, a vertically disposed plate 42 is carried by the cradle D and the frame A. These plates 42 have apertures 42a therein, so that a pin (not shown) may be passed therethrough when the apertures are positioned opposite one another for fixing the position of the cradle D.

Since the cradle D is normally mounted for pivotal or tiltable movement, with respect to the frame A, the unloading of one or more trusses is an easy matter since the fastening means 41 may be released, and the cradle D tilted counterclockwise in FIGURE 1, so that the rear portions of the trusses are positioned upon the ground. The apexes of the trusses are easily removed from the cradle D, since the trusses are merely supported between the transversely disposed bars 20 and 21. Since the trusses are supported by the bars 20 and 21, and by the forwardly spaced vertically adjustable bar F trusses of any size may be readily carried by simply adjusting the height of the bar F.

While a preferred embodiment of the invention has been described using specific terms, such description is for illustrative purposes only, and it is to be understood that changes and variations may be made without departing from the spirit or scope of the following claims.

What is claimed is:

1. In a trailer for carrying trusses and the like having triangular apexes having an elongated substantially horizontal frame, means for hitching the frame to a hauling device and wheels carrying said frame, the improvement including, a transverse cradle for receiving the apexes of longitudinally disposed trusses carried adjacent the rear of the frame, means mounting said cradle for pivotal movement with respect to the frame upon a transverse horizontal axis, said cradle including a pair of transverse aligned bars supporting the apexes of the trusses, a horizontal bar mounted for vertical adjustment carried by the frame spaced forwardly of the cradle supporting the forward portion of the trusses and side support means carried by the frame offering lateral support for the trusses.

2. A trailer for carrying trusses and the like having triangular apexes including, an elongated frame, wheels carrying said frame mounted adjacent the rear of said frame, a transverse cradle for receiving the apexes of the trusses carried adjacent the rear of the frame above the wheels, means mounting said cradle for pivotal movement with respect to the frame upon a transverse horizontal axis, said cradle including a pair of transverse aligned bars supporting the apexes of the trusses, a horizontal bar mounted for vertical adjustment carried by the frame spaced forwardly of the cradle supporting the forward portion of the trusses, and laterally adjustable substantially vertical side supports carried by the horizontal bar for offering lateral support for the trusses.

3. A trailer for carrying trusses and the like having triangular apexes including, an elongated frame, wheels carrying said frame mounted adjacent the rear of said frame, a transverse cradle for receiving the apexes of the longitudinally disposed trusses carried adjacent the rear of the frame above the wheels, said cradle having a pair of transverse aligned bars supporting the apexes of the trusses, and means supporting the aligned bars in superposed relation to the rear of the frame, means mounting said means supporting the aligned bars for pivotal movement with respect to the frame upon a transverse horizontal axis, a horizontal bar carried by the frame spaced forwardly of the cradle supporting the forward portion of the trusses, means for vertically adjusting said horizontal bar, and side support means offering lateral support for the trusses.

4. A trailer for carrying trusses and the like having triangular apexes including, an elongated frame, wheels carrying said frame mounted adjacent the rear of said frame, a transverse cradle for receiving the apexes of the longitudinally disposed trusses carried adjacent the rear of the frame above the wheels, said cradle having a pair of transverse aligned bars supporting the apexes of the trusses, and means supporting the aligned bars in superposed relation to the rear of the frame, means mounting said means supporting the aligned bars for pivotal movement with respect to the frame upon a transverse horizontal axis and carrying said wheels, a horizontal bar carried by the frame spaced forwardly of the cradle supporting the forward portion of the trusses, means for vertically adjusting said horizontal bar, and a pair of laterally adjustable standards carried by said bar offering lateral support to the trusses.

References Cited in the file of this patent

UNITED STATES PATENTS

| | | |
|---|---|---|
| 1,730,777 | Mayer | Oct. 8, 1929 |
| 2,781,920 | Burington | Feb. 19, 1957 |
| 3,032,368 | Sigler et al. | May 1, 1962 |